United States Patent [19]

Kassai

[11] Patent Number: 4,733,882
[45] Date of Patent: Mar. 29, 1988

[54] PUSH ROD FOR BABY CARRIAGE

[75] Inventor: Kenzou Kassai, Osaka, Japan

[73] Assignee: Aprica Kassai Kabushikikaisha, Osaka, Japan

[21] Appl. No.: 58,507

[22] Filed: Jun. 5, 1987

[30] Foreign Application Priority Data

Jun. 16, 1987 [JP] Japan ................. 61-140506

[51] Int. Cl.$^4$ ............................................. B62B 7/08
[52] U.S. Cl. ......................... 280/47.37 R; 280/642; 403/108; 403/330
[58] Field of Search ............... 280/642, 647, 650, 655, 280/657, 658, 47.18, 47.37 R, 47.38; 297/183; 108/146; 403/108, 327, 330; 16/112, 115

[56] References Cited

U.S. PATENT DOCUMENTS

4,577,877  3/1986  Kassai ..................... 280/47.37 R

Primary Examiner—John J. Love
Assistant Examiner—Richard Camby
Attorney, Agent, or Firm—W. G. Fasse; D. H. Kane, Jr.

[57] ABSTRACT

A push rod for a baby carriage comprises lower rods (6), a handle (7), a transverse rod (11), a transverse rod urging spring (14), slider (16), connecting members (20), connecting member urging springs (31), hooks (3), fitting member (23), fitting member urging springs (24), and operating levers (10). When the operating levers (10) are in the first position, the locking pin (48) of each operating lever (10) fits in a locking hole (39) formed in the lower rod (6) while the fitting member (23) fits in an engagement hole (21) formed in the connecting member (20). In this state, if the transverse rod (11) is moved upward, the connecting members (20) and hooks (3) are moved upward, whereby the engagement with pins installed on the baby carriage body is canceled. When the operating levers (10) are in the second position, each locking pin (48) is disengaged from the locking hole (39) while the holder portion (45) of the operating lever (10) presses the fitting member (23) out of the engagement hole (21). In this state, if the handle (7) is moved upward, the sliders (16) are also moved upward, but the connecting members (20) are held stationary by the action of the connecting member urging springs (31).

3 Claims, 21 Drawing Figures

PUSH ROD FOR BABY CARRIAGE

BACKGROUND OF THE INVENTION

This invention relates to a push rod for a baby carriage, which push rod is turnably connected at its lower end to the baby carriage body to provide for two states, a back-to-face push state and a face-to-face push state.

Some persons who push baby carriages are tall while others are short. Thus, it is desirable that the push rod of a baby carriage be constructed so that its level is adjustable. Further, it would be more convenient in use if the push rod can be switched between back-to-face and face-to-face push states depending upon the situation; this gives the parent a sense of peace.

SUMMARY OF THE INVENTION

Accordingly, an object of the invention is to provide a push rod for a baby carriage, which push rod can be easily switched between back-to-face and face-to-face pushing and can be easily adjusted in level.

This invention is a push rod for a baby carriage, which push rod is turnably connected at the lower end thereof to the baby carriage body to provide for two states, a back-to-face push state and a face-to-face push state, said push rod comprising a pair of lower rods, a handle, a transverse rod, a transverse rod urging spring, a pair of sliders, a pair of connecting members, a pair of connecting member urging springs, and a pair of hooks.

The pair of lower rods extend along the right and left lateral surfaces of the baby carriage and are turnably connected at their lower ends to the baby carriage body. The handle is of inverted U-shape having a widthwise connecting portion extending widthwise of the baby carriage and a pair of legs extending downward from the opposite ends of said widthwise connecting portion. The pair of legs receive the upper portions of the pair of lower rods so that the legs are vertically movable on the lower rods.

The transverse rod extends along the widthwise connecting portion of the handle and is supported in the handle so that it is vertically movable. The transverse rod urging spring urges the transverse rod to move downward. The pair of sliders are fixedly attached to the opposite ends of the transverse rod and are vertically movably received in the pair of lower rods. The pair of connecting members are positioned with their upper portions overlapping said sliders and are received in the pair of lower rods so that they are vertically movable. The pair of connecting member urging springs urge the connecting members to move downward.

The pair of hooks are fixedly attached to the connecting members so that they are vertically movable together with the connecting members. When the hooks are in the lower position, they engage engagement pins installed on the baby carriage body to fix the back-to-face or face-to-face push state of said push rod. On the other hand, when the hooks are in the upper position, they are disengaged from the engagement pins.

The pair of sliders are respectively formed with receiver recesses opposed to the connecting members. The pair of connecting members are each formed with a plurality of vertically aligned engagement holes and a communication opening continuously vertically extending through said engagement holes. The pair of lower rods are each formed with a plurality of vertically aligned locking holes and a guide opening continuously vertically extending through said locking holes.

The push rod of the baby carriage further includes a pair of fitting members, a pair of fitting member urging springs, and a pair of operating levers.

The pair of fitting members are respectively movably received in receiver recesses and their heads are adapted to fit in the engagement holes of the connecting members. The pair of fitting member urging springs urge the fitting members to fit in engagement holes. The pair of operating levers are installed on the pair of legs of the handle so that they are turnable between first and second positions.

Each operating lever is shaped to extend through the communication opening and guide opening and has a holder portion capable of pressing the head of the fitting member and a locking pin capable of fitting in the locking holes. When the operating lever is in the first position, the locking pin fits in the locking hole while the fitting member fits in the engagement hole. On the other hand, when the operating lever is in the second position, the locking pin is removed from the locking hole while the holder portion presses the fitting member out of the engagement hole.

When the operating lever is in the first position, since the fitting member received in the receiver recess of the slider is fitted in the engaging hole in the connecting member, the slider moves integrally with the connecting member. Further, since the locking pin on the handle is fitted in the locking hole in the lower rod, vertical movement of the handle is inhibited. In this state, if the transverse rod is operated to move upward, the slider and the connecting member are moved upward together with the transverse rod. In response to the upward movement of the connecting member, the hook is moved upward, canceling its engagement with the engagement pin installed on the baby carriage body. Thus, switching between the back-to-face and face-to-face push states is possible.

When the operating levers are in the second position, since the fitted state between the locking pins on the handle and the locking holes in the lower rods is canceled, the handle can be moved vertically on the lower rods. At this time, since the holder portion of each operating lever presses the fitting member and thereby cancels the fitted state between the fitting member and the engagement hole, the slider and connecting member will not move as a unit. That is, if the handle is moved upward in this state, the sliders are moved upward but the connecting members remain stationary under the action of the connecting member urging springs. Therefore, even if the handle is moved upward, the engaged state between the hooks and the engagement pins on the baby carriage body is not canceled.

As described above, the push rod for a baby carriage according to the invention can be easily switched between back-to-face and face-to-face push states and can be easily adjusted in level.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figures 1, 2:
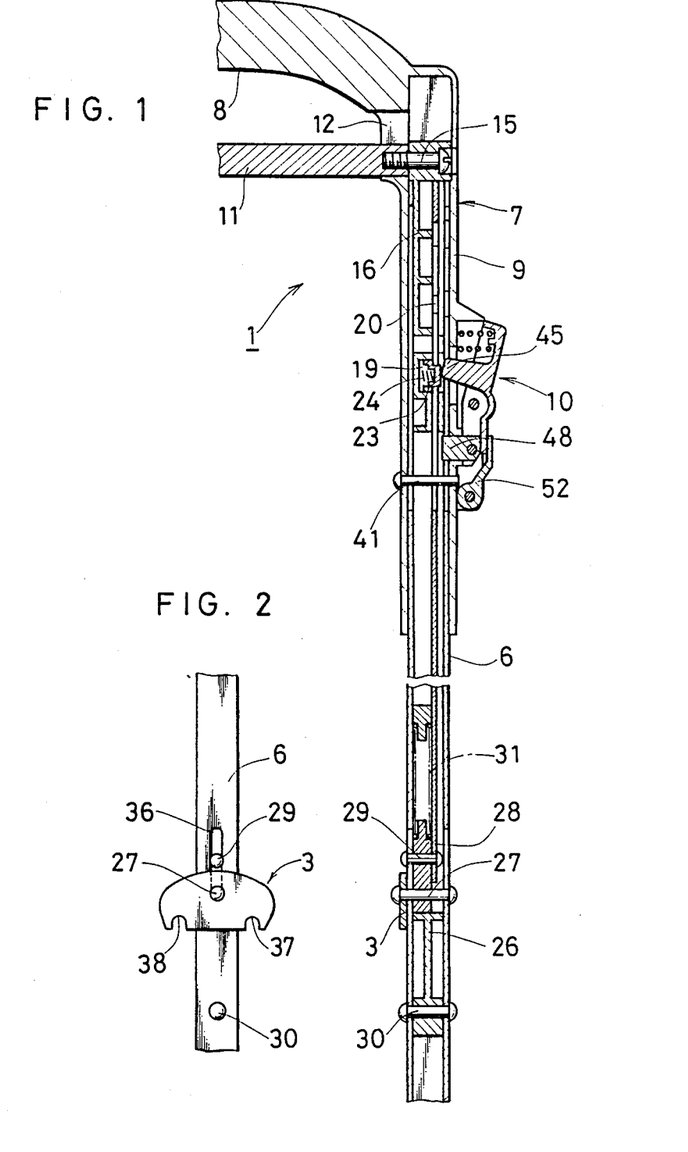
FIG. 1 is a front view, in section, showing the principal portion of an embodiment of the invention.
FIG. 2 is a view looking laterally at a hook shown in FIG. 1.
Figure 3:
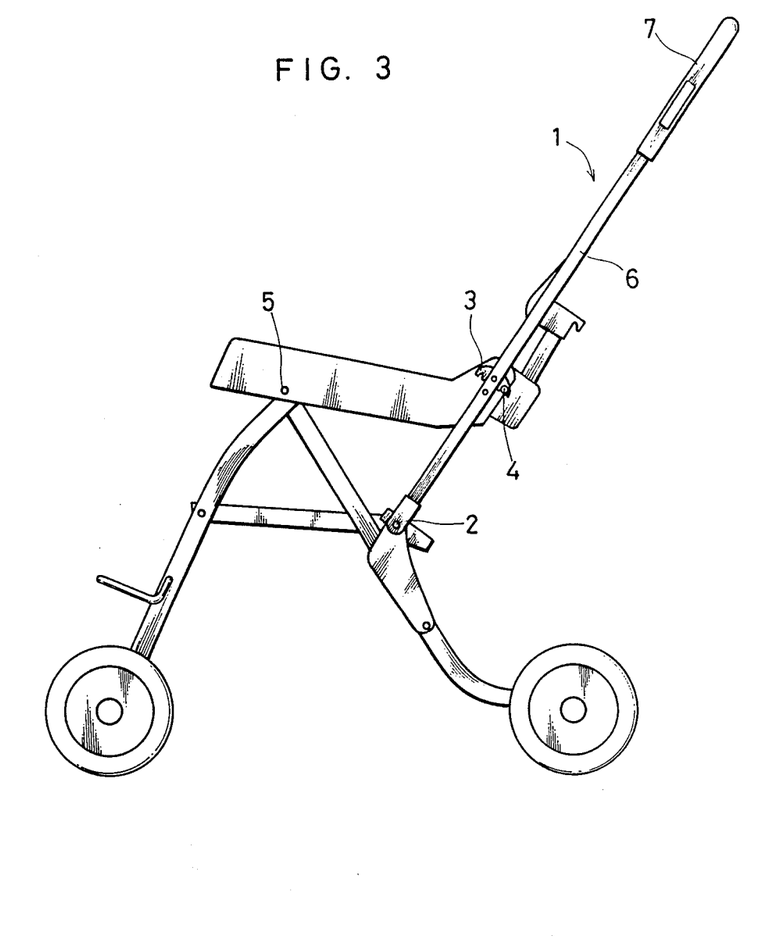
FIG. 3 is a left-hand side view of a baby carriage to which an embodiment of the invention is applied.
Figure 4:
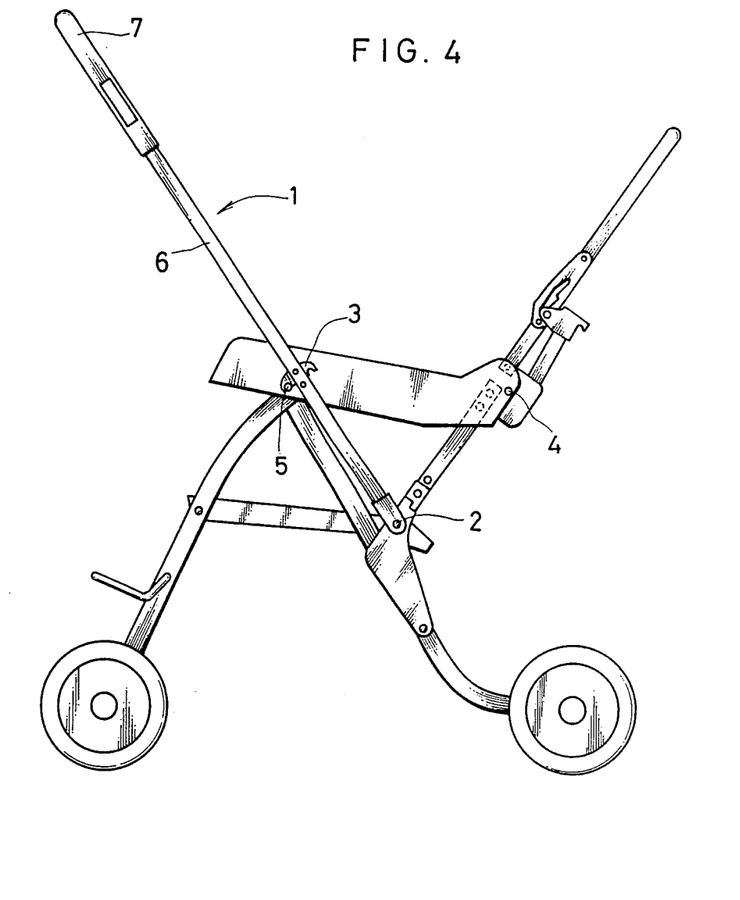
FIG. 4 is a view showing the back-to-face push state established by turning a push rod 1 from the state shown in FIG. 3.

In FIGS. 3 and 4, a left-hand side view of a baby carriage to which an embodiment of the invention is applied is shown. FIG. 1 shows the principal portion of an embodiment of the invention.

Referring to these figures, a push rod 1 is turnably attached at its lower end to the baby carriage body through a shaft 2. FIG. 3 shows the push rod 1 in its back-to-face push state, and FIG. 4 shows the push rod 1 in its face-to-face push state. The push rod 1 has hooks 3. In the back-to-face push state shown in FIG. 3, the hooks 3 engage engagement pins 4 installed on the rear portion of the baby carriage body, whereby the push rod 1 is fixed in the back-to-face push state. When the push rod 1 is in the face-to-face push state shown in FIG. 4, the hooks 3 engage engagement pins 5 installed on the front portion of the baby carriage body, whereby the push rod 1 is fixed in the face-to-face push state. FIG. 2 shows a side view of such hook 3.

The push rod 1 includes a pair of lower rods 6 and a handle 7. The pair of lower rods 6 extend along the right and left sides of the baby carriage body and are turnably attached at their lower ends to the baby carriage body. In FIGS. 1 through 4, only one of the lower rods 6 which is located on the left-hand side of the baby carriage body is shown. The handle 7 is of inverted U-shape having a widthwise extending connecting portion 8 extending widthwise of the baby carriage and a pair of legs 9 extending downward from the opposite ends of said widthwise extending connecting portion 8. The pair of legs 9 receive the upper portions of the pair of lower rods 6 so that the legs 9 can be vertically moved on the lower rods 6.

Figure 5:
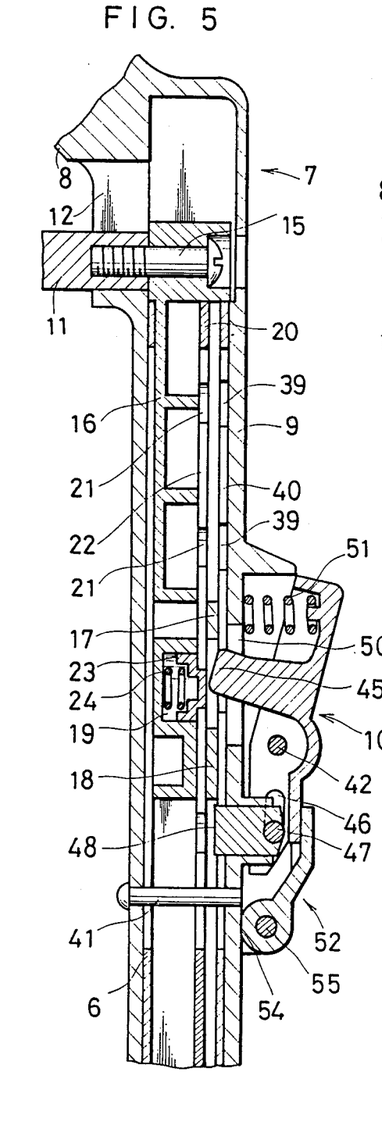
FIG. 5 is an enlarged front view, in section, showing a portion associated with an operating lever 10 shown in FIG. 1.
Figure 6:
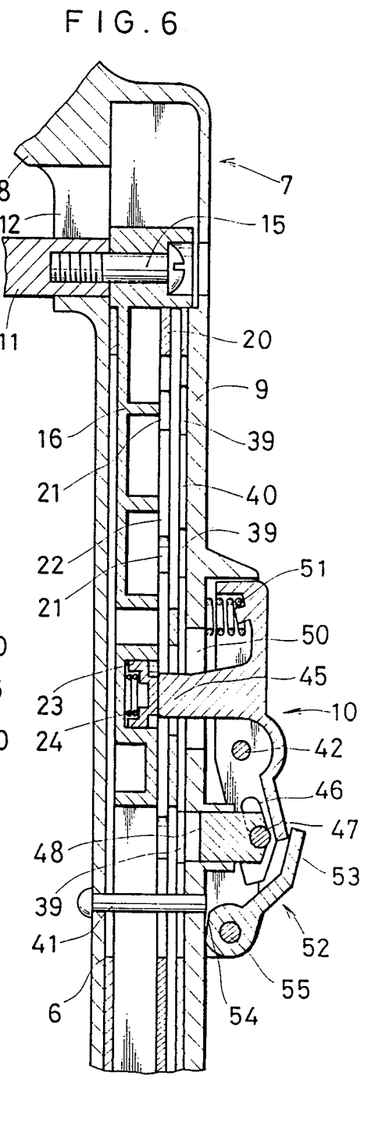
FIG. 6 is a view showing the operating lever 10 turned from the state shown in FIG. 5.

To fix the handle 7 at a suitable level, the pair of legs 9 of the handle 7 are provided with a pair of operating levers 10. FIGS. 5 and 6 are enlarged sectional views showing a portion associated with the operating lever 10. The portion associated with the operating lever 10 will be later described. The legs 9 of the handle 7 and the lower rods 6 are located on the right and left sides of the baby carriage, and since the portion located on the left side is substantially the same in construction as the portion located on the right side, the construction positioned on the left side will be taken up as a representative and described.

Referring to FIGS. 1, 5 and 6, a transverse rod 11 extends along the widthwise extending connecting portion 8 of the handle 7. The opposite ends of the transverse rod 11 are positioned in vertically extending elongated receiver openings 12. Therefore, the transverse rod 11 is vertically movable in the receiver openings 12.

Figure 7:
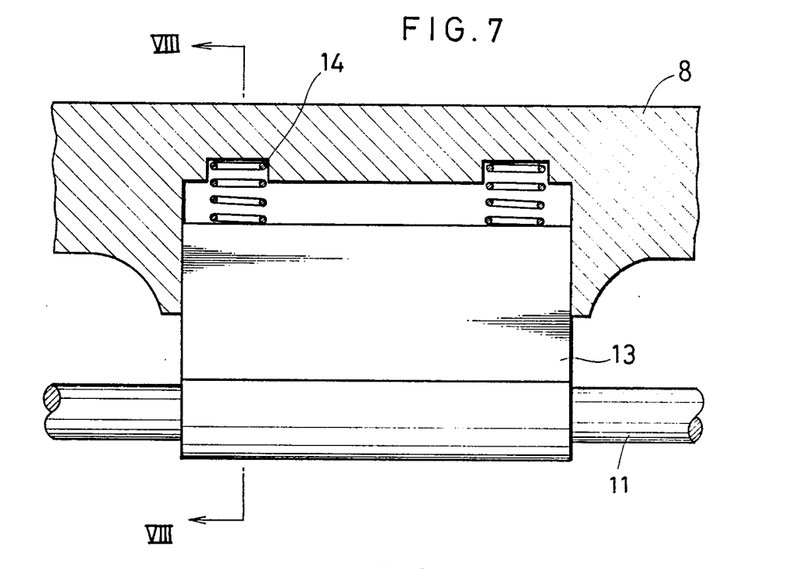
FIG. 7 is an enlarged view of the middle portion of a transverse connecting portion 8 shown in FIG. 1.
Figure 8:
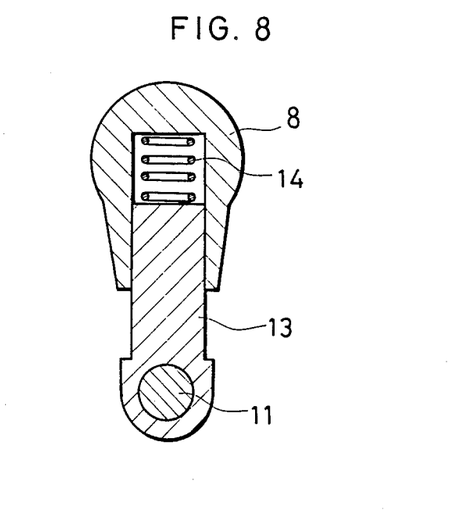
FIG. 8 is a sectional view taken along the line VIII—VIII in FIG. 7.

FIG. 7 shows, on an enlarged scale, the middle portion of the widthwise extending connecting portion 8 of the handle 7. In FIG. 8, a sectional view taken along the line VIII—VIII in FIG. 7 is shown. Referring to these figures, the transverse rod 11 has a transverse rod supporting member 13 fixed thereto, and transverse rod urging springs 14 are disposed between said transverse rod supporting member 13 and the widthwise extending connecting portion 8. The transverse rod urging springs 14 constantly urge the transverse rod 11 to move downward.

As shown in FIGS. 1, 5 and 6, the opposite ends of the transverse rod 11 have a pair of sliders 16 fixed thereto by screws 15. Each slider 16 is received in the lower rod 6 so that it is vertically movable therein.

Figures 9, 10:
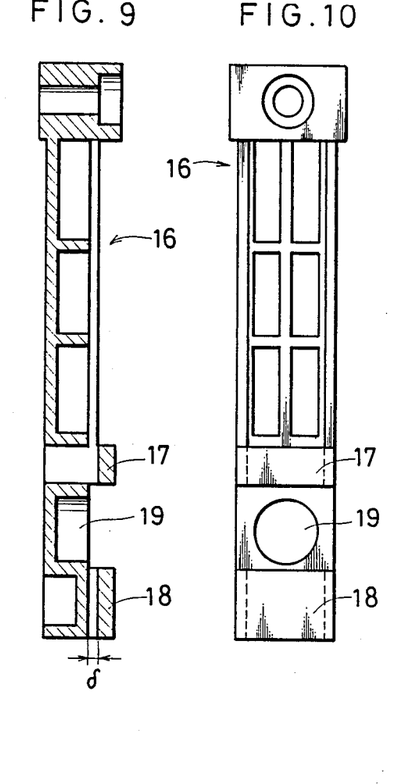
FIG. 9 is a front view, in section, of a slider 16 shown in FIG. 1.
FIG. 10 is a side view of the slider of FIG. 9.

In FIGS. 9 and 10, the slider 16 is shown. The slider 16 has walls 17 and 18 separated by a clearance δ from its main portion. Further, a receiver recess 19 is formed between the walls 17 and 18.

Figure 11:
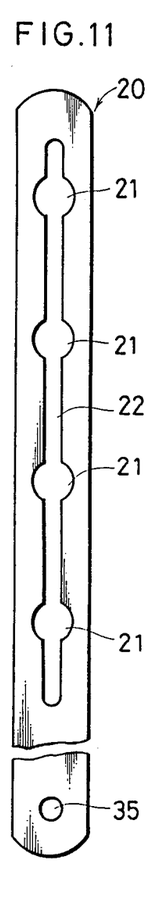
FIG. 11 is a side view of a connecting member 20 shown in FIG. 1.

A connecting member 20 is disposed so that it extends through the clearance defined by the walls 17 and 18. In other words, the connecting member 20, as shown in FIGS. 1, 5 and 6, is disposed to overlap the slider 16 and is received in the lower rod 6 so that it is vertically movable. In FIG. 11, the connecting member 20 is shown. As shown, the connecting member 20 is formed with a plurality of vertically aligned engagement holes 21 and a communication opening 22 continuously vertically extending through said engagement holes 21.

Figure 13:
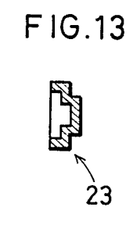
FIG. 13 is a front view, in section, of a fitting member 23 shown in FIG. 1.
Figure 14:
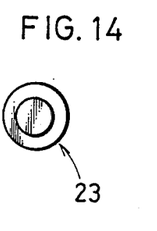
FIG. 14 is a side view of the fitting member 23.

A fitting member 23 shown in FIGS. 13 and 14 is movably received in the receiver recess 19 of the slider 16. The fitting member 23 has a head shaped to fit in the engagement holes 21 of the connecting member 20. In the state shown in FIG. 5, the fitting member 23 fits in one engagement hole 21 in the connecting member 20, while in FIG. 6 its fitted state is canceled. As shown in FIGS. 5 and 6, the fitting member 23 is constantly urged by a fitting member urging spring 24 to move in the direction to fit in such engagement hole 21 in the connecting member 20.

If the fitting member 23 is fitted in any of the engagement holes 21 in the connecting member 20, the slider 16 and the connecting member 20 will move as a unit.

Reversely, if the fitting member 23 is disengaged from the engagement holes 21, the slider 16 and the connecting member 20 will not move as a unit.

Figure 15:
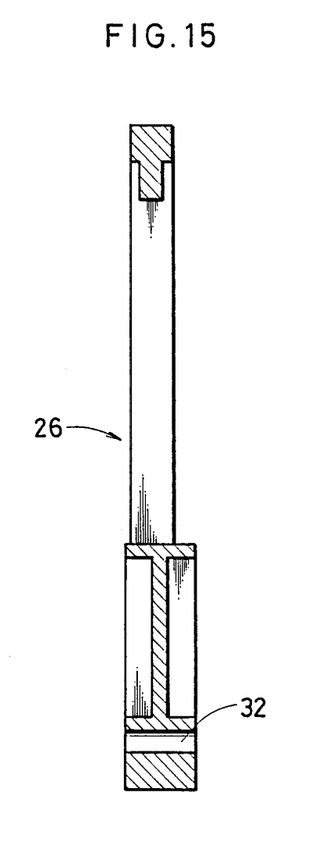
FIG. 15 is a front view, in section, of an inner fixed member 26 shown in FIG. 1.
Figure 16:
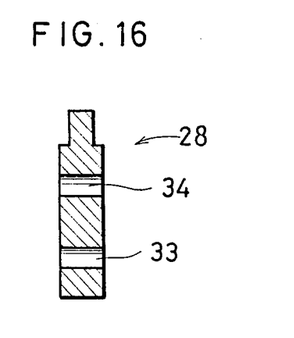
FIG. 16 is a front view, in section, of a hook supporting member 28 shown in FIG. 1.

Referring to FIG. 1, an inner fixed member 26 is fixed inside lower rod 6 by a pin 30. In FIG. 15, a front sectional view of the inner fixed member 26 is shown. A through-hole 32 receives the pins 30. In an opening in the inner fixed member 32, a hook support member 28, a front sectional view of which is shown in FIG. 16, is vertically movably disposed. The hook 3 is attached to said hook support member 28 by a pin 27. Further, the lower end of the connecting member 20 is also fixedly attached to said hook support member 28 by a pin 29. A through-hole 33 shown in FIG. 16 is used to receive the pin 27 and a through-hole 34 is used to receive the pin 29. As shown in FIG. 2, the pins 27 and 29 extend through vertically elongated opening 36 formed in the lower rod 6.

Further, as shown in FIG. 1, a connecting member urging spring 31 is disposed between the upper end of the inner fixed member 26 and the hook support member 28. The connecting member urging spring 31 constantly urges the connecting member 20 to move downward. In other words, the hook 3 is constantly urged to move downward by the action of the connecting member urging spring 31.

Referring to FIG. 2, the hook 3 is formed with two engagement recesses 37 and 38. One engagement recess 37 is adapted to engage the engagement pin 5 shown in FIG. 3, and the other engagement recess 38 is adapted to engage the engagement pin 4 shown in FIG. 4. When the hook 3 is in the lower position shown in FIGS. 1 and 2, the hook 3 is capable of engaging the engagement pins 4 and 5 installed on the baby carriage body. When the hook 3 is moving upward against the force of the connecting member urging spring 31, its engagement with the pin 4 or 5 is canceled. In addition, a through-hole 35 in the connecting member 20 shown in FIG. 11 is used to receive the pin 29.

Figure 12:
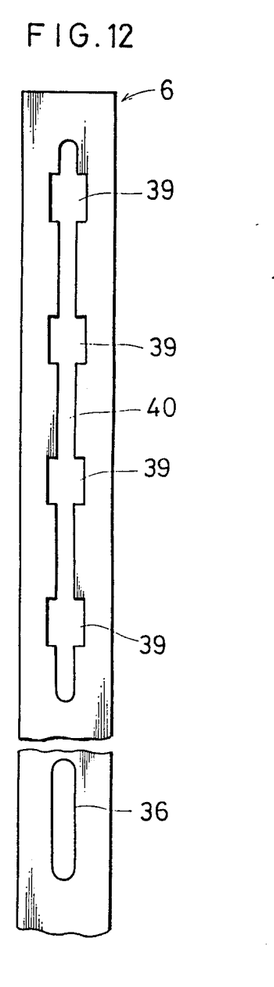
FIG. 12 is a view looking laterally at a lower rod 6 shown in FIG. 1.

Referring to FIG. 12, the lower rod 6 is formed with a plurality of vertically aligned locking holes 39 and a guide opening 40 continuously vertically extending through said locking holes 39. A pin 41 shown in FIGS. 5 and 6 is fixed on the associated leg 9 of the handle and extends through the communication opening 22 in the connecting member 20 and guide opening 40 in the lower rod 6.

Figures 17, 18, 19, 20, 21:
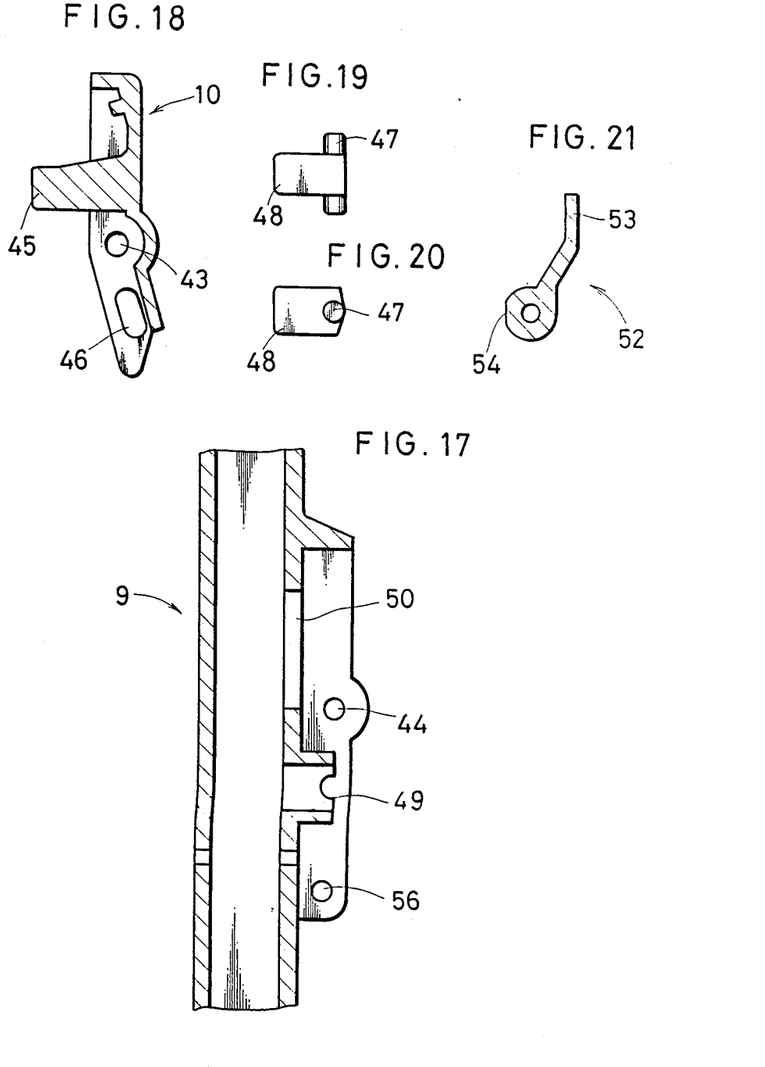
FIG. 17 is a front view, in section, showing that portion of a leg 9 of a handle 7 to which the operating lever 10 is attached.
FIG. 18 is a front view, in section, of the operating lever 10.
FIG. 19 is a plan view of a locking pin 48 shown in FIG. 1.
FIG. 20 is a plan view of the locking pin 48.
FIG. 21 is a front view, in section, of a stop 25 shown in FIG. 1.

FIG. 17 shows the portion of the leg 9 of the handle 7 to which the operating lever 10 is attached. The operating lever 10 shown in FIG. 18 is turnably attached to the leg 9 of the handle 7 through a pin 42 (see FIGS. 5 and 6). The pin 42 extends through a through-hole 44 shown in FIG. 17 and a through-hole 43 shown in FIG. 18. The operating lever 10 is turnable between the first position shown in FIG. 5 and the second position shown in FIG. 6.

The operating lever 10 is formed with a holder portion 45 which extends through an elongated opening 50 formed in the leg 9 of the handle 7 and a guide opening 40 in the lower rod 6. The holder portion 45 is adapted to press the head of the fitting member 23 received in the receiver recess 19 of the slider 16. Further, as shown in FIG. 18, an elongated opening 46 is formed in the operating lever 10. A locking pin 48 shown in FIGS. 19 and 20 is attached by utilizing said elongated opening 46. The locking pin 48 has a shaft portion 47 which is held in the elongated opening 46. The locking pin 48 is moved as it is guided by a guide opening 49 formed in the leg 9 of the handle 7. When the handle 7 and lower rod 6 are in the predetermined positional relationship, the locking pin 48 is capable of fitting in the locking hole 39 formed in the lower rod 6.

Referring to FIG. 5, when the operating lever 10 is in the first position as shown, the locking pin 48 is fitted in the locking hole 39 of the lower rod 6. Therefore, in the state shown in FIG. 5, vertical movement of the handle 7 is inhibited. On the other hand, the holder portion 45 is not pressing the head of the fitting member 23. Thus, the fitting member 23 is fitted in the engagement hole 21 in the connecting member 20. That is, in the state shown in FIG. 5, the slider 16 and connecting member 20 move as a unit.

When the operating lever 10 is in the second position shown in FIG. 6, the locking pin 48 is disengaged from the locking hole 39 of the lower rod 6. Therefore, the handle 7 is capable of vertical movement. On the other hand, the holder portion 45 is pressing the head of the fitting member 23. Therefore, the fitting member 23 is disengaged from the engagement hole 21 in the connecting member 20. In this state, the slider 16 and the connecting member 20 will not move as a unit.

The operation in the state shown in FIGS. 5 and 6 will be later described in detail. In addition, as shown in FIGS. 5 and 6, a spring 51 is installed between the operating lever 10 and the leg 9 of the handle 7, constantly urging the operating lever 10 to turn back to the first position shown in FIG. 5.

Further, as shown in FIGS. 5 and 6, the leg 9 of the handle 7 has a stop 52 turnably attached thereto by a pin 55 for reinforcing the fitted state between the locking pin 48 on the operating lever 10 and the locking hole 39 in the lower rod 6. In FIG. 21, a sectional view of the stop 52 is shown. The pin 55 extends through a through-hole 56 shown in FIG. 17. The stop 52 has a holder wall 53 covering a portion of the operating lever 10, and a brake portion 54 adapted to contact the leg 9 of the handle 7 to suppress rotation of said stop 52. The brake portion 54 is in the form of a flat surface. Therefore, as shown in FIG. 5, when the brake portion 54 is in surface contact with the leg 9 of the handle 7, the stop 52 is stabilized. Therefore, to turn the stop 52 from the position shown in FIG. 5, a substantial amount of force is required. Thus, the stop 52 reinforces the fitted state between the locking pin 48 on the operating lever 10 and the locking hole 39 in the lower rod 6.

The operation of the push rod will now be described with reference to FIGS. 1, 5 and 6.

First, as shown in FIG. 5, when the operating lever 10 is in the first position, the locking pin 48 on the handle 7 is fitted in the locking hole 48 in the lower rod 6. Therefore, vertical movement of the handle 7 is inhibited. Further, since the fitting member 23 received in the receiver recess 19 of the slider 16 is fitted in the engagement hole 21 in the connecting member 20, the slider 16 and the connecting member 20 will move as a unit. Thus, in the state shown in FIG. 5, if the transverse rod 11 is operated to move upward, the connecting member 20 is also moved upward. Since the hook 3 is fixedly attached to the connecting member 20, movement of the transverse rod 11 causes upward movement of the hook 3, so that its engagement with the engagement pin 4 or 5 installed on the baby carriage body is canceled. As a result, switching between back-to-face and face-to-face push states is made possible.

Next, when the operating lever 10 is in the second position as shown in FIG. 6, the fitted state between the locking pin 48 and the locking hole 39 is canceled. Therefore, the handle 7 can be vertically moved on the lower rod 6. Further, since the holder portion 45 of the operating lever 10 is pressing the head of the fitting member 23, the fitted state between the fitting member 23 and the engagement hole 21 in the connecting member 20 is also canceled. Thus, the slider 16 and the connecting member 20 will not move as a unit. In this state, the connecting member 20 is constantly urged by the connecting member urging spring 31 shown to remain in the lower position.

Suppose that the handle 7 is moved upward from the state shown in FIG. 6. In response to the upward movement of the handle 7, the slider 16, the fitting member 20 and the operating lever 10 also move upward. However, the lower rod 6 and the connecting member 20 remain stationary. In addition, during said movement, the holder portion 45 of the operating lever 10 moves within the communication opening 22 in the connecting member 20 and within the guide opening 40 in the lower rod 6. If the hand pressing the operating lever 10 releases it when the handle 7 reaches a suitable lever, the operating lever 10 is turned back to the first position shown in FIG. 5 by the action of the fitting member urging spring 24 and the spring 51. In this state, vertical movement of the handle 7 is inhibited and the push rod is fixed at a suitable level.

Referring to FIGS. 5 and 6, the spring 51 disposed between the operating lever 10 and the handle 7, and the stop 52 both serve to reinforce the fitted state between the locking pin 48 and the locking hole 39 in the lower rod 6. However, these members are not absolutely necessary. That is, the fitted state between the locking pin 48 and the locking hole 39 could be maintained by the fitting member urging spring 24, though more or less weakened.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A push rod for a baby carriage, which push rod is turnably attached at its lower end to the baby carriage body so that it can be switched between back-to-face and face-to-face push states, comprising
    a pair of lower rods (6) extending along the right and left sides of the baby carriage body and turnably attached at their lower ends to the baby carriage body,
    a handle (7) in the form of an inverted U-shape having a widthwise extending connecting portion (8) and a pair of legs (9) extending downward from the opposite ends of said widthwise extending connecting portion, said legs (9) receiving the upper portions of said lower rods (6) so that said legs (9) are vertically slidable on said lower rods (6),
    a transverse rod (11) extending along the widthwise extending connecting portion (8) and supported by said handle (7) so that it is vertically movable,
    a transverse rod urging spring (14) constantly urging said transverse rod (11) to move downward,
    a pair of sliders (16) fixedly attached to the opposite ends of said transverse rod (11) and received in said lower rods (6) so that they are vertically movable,
    a pair of connecting members (20) having their upper portions disposed to overlap said sliders (16) and received in said lower rods (6) so that they are vertically movable,
    a pair of connecting member urging springs (31) constantly urging said connecting members (20) to move downward,
    a pair of hooks (3) fixedly attached to said connecting members (20) so that they are vertically movable, said hooks being arranged so that when they are in the lower position they engage engagement pins installed on the baby carriage body to fix the back-to-face or face-to-face push state of said push rod but when they are in the upper position they are disengaged from said pins,
    said pair of sliders (16) being respectively formed with receiver recesses (19) opposed to said connecting members (20),
    said pair of connecting member (20) being each formed with a plurality of vertically aligned engagement holes (21) and a communication opening (22) continuously vertically extending through said engagement holes (21),
    said pair of lower rods (6) being each formed with a plurality of vertically aligned locking holes (39) and a guide opening (40) continuously vertically extending through said locking holes (39),
    a pair of fitting members (23) movably received in said receiver recesses (19) and having heads adapted to fit in said engagement holes (21),
    a pair of fitting member urging springs (24) constantly urging said fitting members (23) to move in the direction to fit in said engagement holes (21),
    a pair of operating levers (10) provided on the pair of legs (9) of said handle (7) so that they are turnable between a first position and a second position,
    each of said operating levers (10) being shaped to extend through said communication opening (22) and said guide opening (40) and having a holder portion (45) capable of pressing the head of said fitting member (23) and a locking pin (48) capable of fitting in said locking holes (39),
    wherein when said operating lever (10) is in said first position, said locking pin (48) fits in said locking hole (39) and said fitting member (23) fits in said engagement hole (21), and
    wherein when said operating lever (10) is in said second position, said locking pin (48) is disengaged from said locking hole (39) and said holder portion (45) presses said fitting member (23) out of said engagement hole (21).

2. A push rod for a baby carriage as set forth in claim 1, wherein
    each of said legs (9) of said handle (7) has a stop (52) turnably attached thereto for reinforcing the fitted state between said locking pin (48) and said locking hole (39),
    said stop (52) having a holder wall (53) covering a portion of said operating lever (10), and a brake portion (54) for contacting the leg (9) of said handle (7) to suppress rotation of said stop (52).

3. A push rod for a baby carriage as set forth in claim 1, wherein a spring (51) is disposed between said operating lever (10) and the leg (9) of said handle (7), so that said operating lever (10) is constantly urged by said spring (51) to turn back to said first position.

* * * * *